(12) United States Patent
Seelert et al.

(10) Patent No.: US 11,101,614 B1
(45) Date of Patent: Aug. 24, 2021

(54) SECOND-HARMONIC GENERATION CRYSTAL

(71) Applicant: Coherent LaserSystems GMBH & Co. KG, Göttingen (DE)

(72) Inventors: Wolf Seelert, Lübeck (DE); Rüdiger Von Elm, Wielen (DE)

(73) Assignee: Coherent LaserSystems GMBH & Co. KG, Göttingen (DE)

(*) Notice: Subject to any disclaimer, the term of this patent is extended or adjusted under 35 U.S.C. 154(b) by 0 days.

(21) Appl. No.: 16/801,857

(22) Filed: Feb. 26, 2020

(51) Int. Cl.
| | |
|---|---|
| *H01S 3/10* | (2006.01) |
| *H01S 3/109* | (2006.01) |
| *H01S 3/108* | (2006.01) |
| *H01S 3/00* | (2006.01) |

(52) U.S. Cl.
CPC .............. *H01S 3/109* (2013.01); *H01S 3/108* (2013.01); *H01S 3/0092* (2013.01)

(58) Field of Classification Search
CPC ......... H01S 3/109; H01S 3/108; H01S 3/0092
See application file for complete search history.

(56) References Cited

U.S. PATENT DOCUMENTS

| | | | |
|---|---|---|---|
| 5,850,407 A | 12/1998 | Grossman et al. | |
| 7,466,728 B2 | 12/2008 | Clubley et al. | |
| 10,474,004 B1 * | 11/2019 | Seelert ................. | G02B 5/3083 |
| 2006/0114946 A1 | 6/2006 | Sun et al. | |
| 2007/0201532 A1 * | 8/2007 | Zhang .................... | H01S 3/081 |
| | | | 372/93 |
| 2007/0253453 A1 * | 11/2007 | Essaian .................. | H01S 3/109 |
| | | | 372/22 |
| 2010/0110534 A1 * | 5/2010 | Muramatsu .......... | G02F 1/3558 |
| | | | 359/328 |
| 2011/0128609 A1 * | 6/2011 | Kannengiesser .... | G02B 7/1815 |
| | | | 359/298 |
| 2017/0170623 A1 * | 6/2017 | Chen ...................... | H01S 3/0604 |
| 2020/0057356 A1 | 2/2020 | Maker et al. | |

FOREIGN PATENT DOCUMENTS

| | | |
|---|---|---|
| JP | 2014-32300 A | 2/2014 |
| WO | WO-2017172868 A1 | 10/2017 |
| WO | WO-2018215748 A1 | 11/2018 |

OTHER PUBLICATIONS

International Search Report and Written Opinion for International Patent Application No. PCT/EP2021/054917, dated Jun. 2, 2021, 13 pages.

* cited by examiner

*Primary Examiner* — Kinam Park
(74) *Attorney, Agent, or Firm* — Morrison & Foerster LLP (57) ABSTRACT

An optic produces a beam of ultraviolet laser radiation from a beam of visible laser radiation and spatially separates the ultraviolet laser beam from the visible laser beam. The optic includes two crystals made of the same optically-nonlinear material that are contact bonded along a planar interface. One crystal has principle crystal axes that are oriented for type-I second-harmonic generation. The ultraviolet laser beam exits the optic through an uncoated surface of the other crystal. The principle crystal axes of the two crystals have different orientations and have reflection symmetry about the planar interface.

26 Claims, 8 Drawing Sheets

SECOND-HARMONIC GENERATION CRYSTAL

TECHNICAL FIELD OF THE INVENTION

The present invention relates in general to optical elements for generating second-harmonic radiation. The invention relates in particular to optically-nonlinear crystals for generating ultraviolet wavelength radiation by harmonic conversion of visible wavelength radiation and to separating the ultraviolet radiation from residual visible radiation.

DISCUSSION OF BACKGROUND ART In laser devices for providing ultraviolet wavelength radiation, it is usual to produce the ultraviolet (UV) radiation by harmonic conversion of visible wavelength radiation in an optically-nonlinear crystal. Typically, the visible radiation is produced by second-harmonic conversion of near-infrared (NIR) wavelength radiation generated in a solid-state laser, such as an optically-pumped semiconductor (OPS) laser.

By way of example, in one common arrangement for producing continuous-wave UV radiation, the visible radiation is produced by intra-cavity second-harmonic conversion of NIR radiation within a solid-state laser. The visible radiation is coupled into an impedance-matched resonant-enhancement cavity for the visible radiation. An optically-nonlinear crystal within the resonant cavity then converts the visible radiation to UV radiation by type-I second-harmonic conversion. Using an OPS solid-state laser, it is possible to produce UV radiation having a wavelength of 266 nanometers (nm) or less. A difficulty with type-I second-harmonic conversion is that there is no inherent spatial separation between the UV radiation produced and residual visible radiation.

Typically, the UV radiation is directed out of the resonant cavity by a dichroic mirror having a thin-film dielectric coating. This dichroic mirror may serve as one of the resonator mirrors, reflecting the visible radiation and transmitting the UV radiation. Alternatively, the dichroic mirror may be a separate intra-cavity element, transmitting the visible radiation and reflecting the UV radiation out of the resonant cavity.

A particular limitation of the laser arrangements described above is damage to thin-film dielectric coatings caused by the UV radiation. This limitation becomes more problematic for shorter-wavelength UV radiation. Although intra-cavity elements can be translated, shifting a damaged area out of the radiation and exposing a virgin area, such shifting adds significant complexity and cost to the laser device. Further, even a coating that has not yet been damaged will typically have losses due to manufacturing variances in layer-thickness or due to absorption by the materials of the coating. Such losses reduce the efficiency of resonant cavities using intra-cavity harmonic generation and ultimately the useful lifetime of these resonant cavities.

An apparatus that overcomes these limitations is described in U.S. Pat. No. 10,474,004, assigned to the assignee of the present invention, the complete disclosure of which is incorporated herein by reference. An uncoated birefringent prism receives visible radiation UV radiation generated by an optically-nonlinear crystal. The visible radiation and the UV radiation have orthogonal linear polarizations. The birefringent crystal has an internal surface oriented at Brewster angle for the visible radiation and oriented for total internal reflection of the UV radiation. The birefringent crystal is an additional element having optical surfaces that must be oriented with relatively-high precision. Both the visible radiation and the UV radiation must traverse two surfaces of the birefringent crystal, with some unavoidable reflection losses.

There is need for a laser device that generates UV radiation and separates the UV radiation from visible radiation, which does not expose any coatings to the UV radiation. Preferably, generation and separation would be accomplished while adding minimal optical elements, optical surfaces, complexity, and cost to the laser device.

SUMMARY OF THE INVENTION

In one aspect, an optic for converting radiation having a fundamental wavelength to radiation having a second-harmonic wavelength in accordance with the present invention comprises a first crystal made of an optically-nonlinear material. The first crystal has principle crystal axes that are oriented to convert fundamental radiation to second-harmonic radiation by second-harmonic generation. A second crystal is provided that is made of the same optically-nonlinear material as the first crystal. The first and second crystals are bonded together along a first planar interface. The first planar interface is tilted with respect to the fundamental radiation. The principle crystal axes of the first and second crystals have a mutual angular separation and have reflection symmetry about the first planar interface. The coefficients of thermal expansion of the first and second crystals are thereby matched along the first planar interface.

In another aspect, a laser apparatus for producing a beam of laser radiation at a second-harmonic wavelength in accordance with the present invention comprises a laser delivering a beam of laser radiation at a fundamental wavelength that is twice the second-harmonic wavelength. An impedance-matched resonant-enhancement cavity is provided and receives the fundamental laser beam. The resonant-enhancement cavity is defined by a plurality of cavity mirrors that are highly reflective at the fundamental wavelength and are arranged to direct the fundamental laser beam along a closed path within the resonant-enhancement cavity. An optic is provided and located in the closed beam path of the resonant-enhancement cavity. The optic includes a first crystal and a second crystal made of the same optically-nonlinear material. The optically-nonlinear material has principle crystal axes. The principle crystal axes of the first crystal are oriented to convert fundamental radiation to second-harmonic radiation by second-harmonic generation. The first and second crystals are bonded together along a planar interface that is tilted with respect to the fundamental laser beam. The principle crystal axes of the first and second crystals are mutually separated by an angle of at least 2°. The principle crystal axes of the first and second crystals have reflection symmetry about the planar interface. The coefficients of thermal expansion of the first and second crystals are thereby matched along the planar interface.

In yet another aspect, an optic for converting radiation having a first fundamental wavelength and radiation having a second fundamental wavelength to radiation having a sum-frequency wavelength in accordance with the present invention comprises a first crystal made of an optically-nonlinear material. The first crystal has principle crystal axes that are oriented to convert first fundamental radiation and second fundamental radiation to sum-frequency radiation by sum-frequency generation. A second crystal is provided that is made of the same optically-nonlinear material as the first crystal. The first and second crystals are bonded together along a planar interface. The planar interface is tilted with respect to the first and second fundamental radiation. The principle crystal axes of the first and second crystals have a mutual angular separation and have reflection symmetry about the planar interface. The coefficients of thermal expansion of the first and second crystals are thereby matched along the planar interface.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 1A is a perspective view, FIG. 1B is a plan view.

FIG. 7A is a perspective view, FIG. 7B is a plan view.

DETAILED DESCRIPTION OF THE INVENTION

Figure 1A:
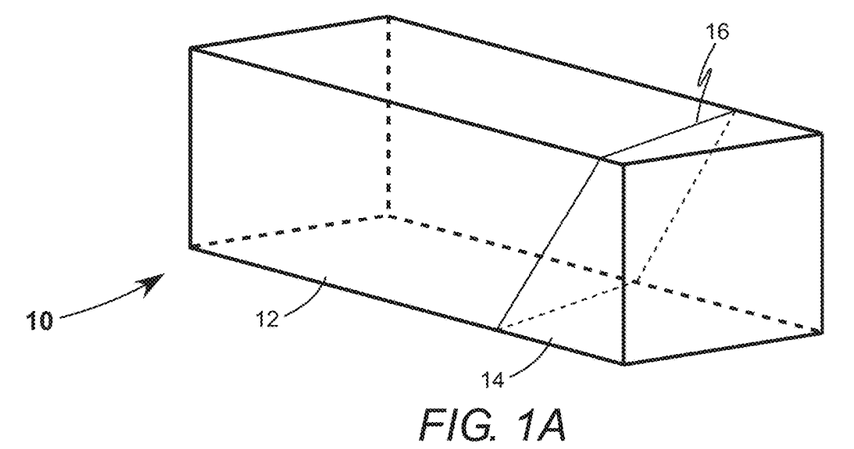
Figure 1B:
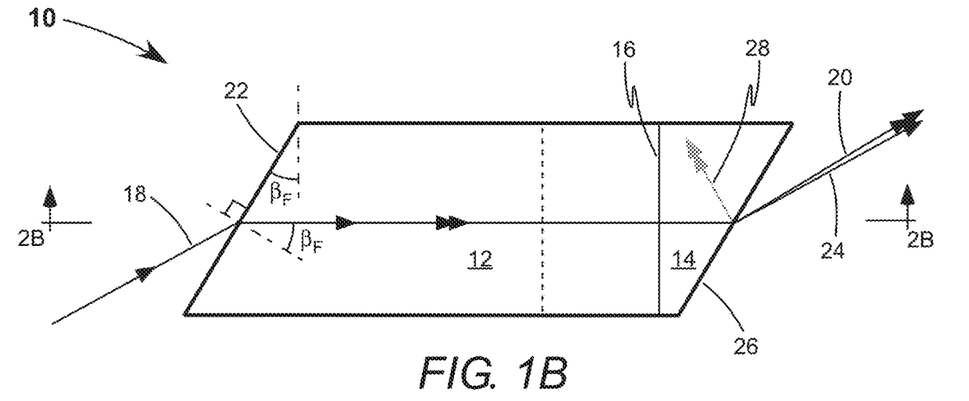
Figure 1C:
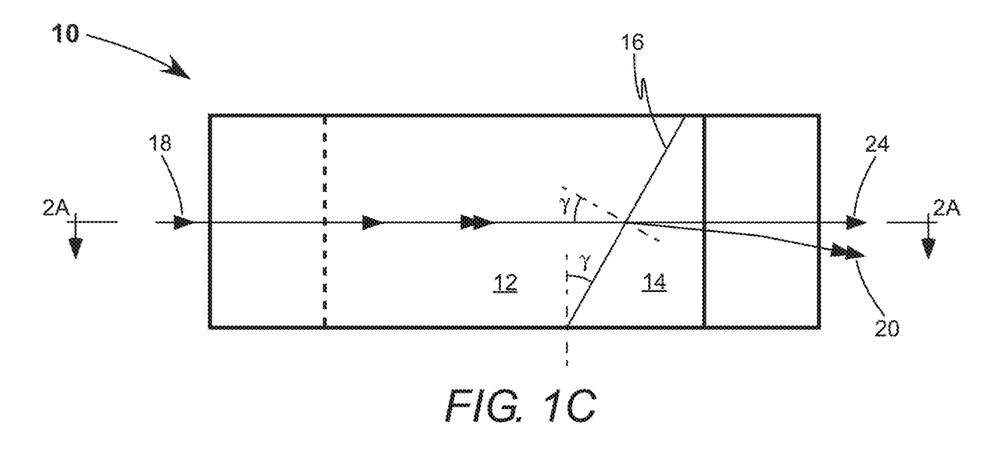
FIG. 1C is a side view schematically illustrating one preferred embodiment of an optic in accordance with the present invention for converting a beam of fundamental radiation into a beam of second-harmonic radiation and separating the two beams, including a first crystal bonded to a second crystal along a planar interface, the separated beams exiting the optic through an uncoated output surface.

Referring now to the drawings, wherein like components are designated by like numerals, FIGS. 1A-1C schematically illustrate a preferred embodiment of an optic 10 in accordance with the present invention. FIG. 1A is a perspective view, FIG. 1B is a plan view, and FIG. 1C is a side view of optic 10. The outside edges of optic 10 are emphasized by heavy lines in the drawings. Optic 10 includes a first crystal 12 and a second crystal 14 that are made of the same transparent optically-nonlinear material. First crystal 12 and second crystal 14 are bonded together along a planar internal interface 16.

First crystal 12 is oriented and arranged to convert a beam of fundamental radiation 18 having a fundamental wavelength to a beam of second-harmonic radiation 20 having a second-harmonic wavelength by type-I second-harmonic generation. Two photons of fundamental beam 18 are converted to each photon of second-harmonic beam 20. The fundamental wavelength is twice the second-harmonic wavelength for energy conservation. In type-I second-harmonic generation, the fundamental radiation has ordinary linear polarization and the second-harmonic radiation has extra-ordinary linear polarization, as known in the art.

Here, "oriented" refers to orienting the principle crystal axes with respect to the plane-of-polarization and the direction-of-propagation of fundamental beam 18 to achieve momentum conservation or "phase matching". Phase matching exploits the birefringence of the optically-nonlinear material and is necessary for efficient second-harmonic generation. The principle crystal axes of second crystal 14 have a different orientation with respect to fundamental beam 18. Therefore, crystal 14 is not phase matched and does not produce significant second-harmonic radiation.

Here, fundamental beam 18 enters optic 10 through an uncoated input surface 22, which is oriented at the internal Brewster angle $\beta_F$ of the fundamental radiation to minimize reflection losses. An alternative arrangement would have input surface 22 at normal incidence to fundamental beam 18 and an anti-reflection coating on input surface 22 to minimize reflection losses. Fundamental beam 18 is partially converted to second-harmonic beam 20 while propagating through first crystal 12. The second-harmonic beam and a beam of residual fundamental radiation 24 are incident on internal interface 16 at normal incidence in the plane of FIG. 1B and at a non-normal angle-of-incidence γ in the plane of FIG. 1C. The optically-nonlinear material has different refractive indices for the orthogonally polarized beams. The ordinary-polarization fundamental beam has the same refractive index in each crystal, while the extra-ordinary-polarization second-harmonic beam has different refractive indices, resulting in the second-harmonic beam being refracted away from the residual fundamental beam at internal interface 16.

Both residual fundamental beam 24 and second-harmonic beam 20 exit optic 10 through an uncoated output surface 26, which is oriented at the internal Brewster angle $\beta_F$ with respect to the residual fundamental beam to minimize reflection losses at the fundamental wavelength. Input surface 22 and output surface 26 are parallel so that overall optic 10 does not cause an angular displacement of the fundamental radiation; that is, fundamental beam 18 and residual fundamental beam 24 propagate in the same direction outside of optic 10. The different refractive indices of the orthogonally polarized second-harmonic and residual fundamental beams cause these beams to be refracted at different angles by output surface 26 and creates an additional internally-reflected beam 28 at the second-harmonic wavelength, depicted in FIG. 1B. The refracted residual fundamental beam 24 and second-harmonic beam 20 diverge and become spatially separated as they propagate away from output surface 26 of optic 10.

Figure 2A:
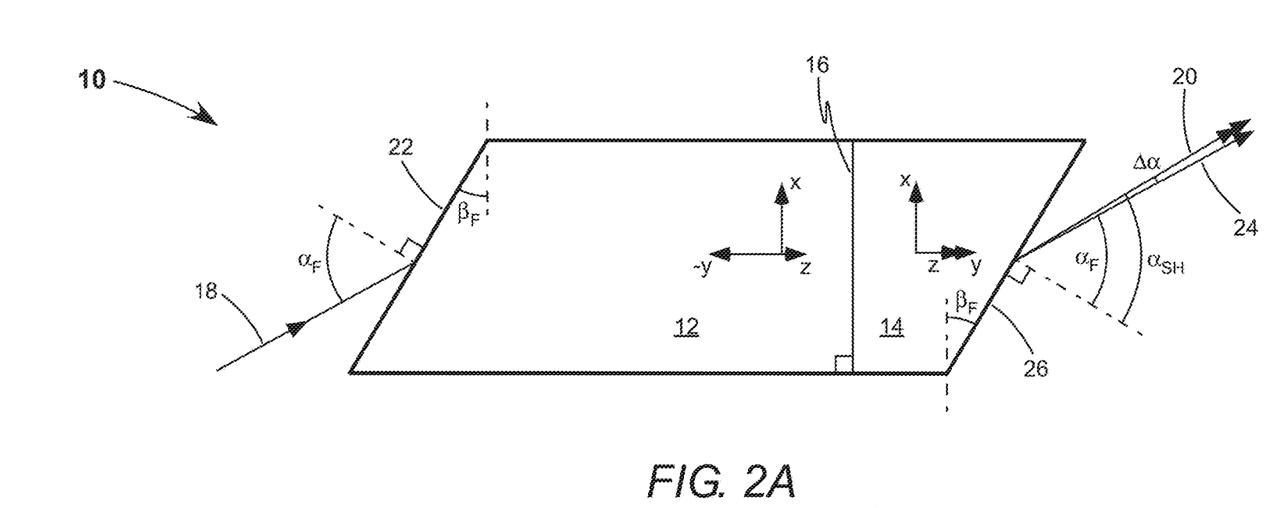
FIG. 2A is a cross-sectional plan view and FIG. 2B is a cross-sectional side view schematically illustrating further details of the optic of FIGS. 1A-1C.
Figure 2B:
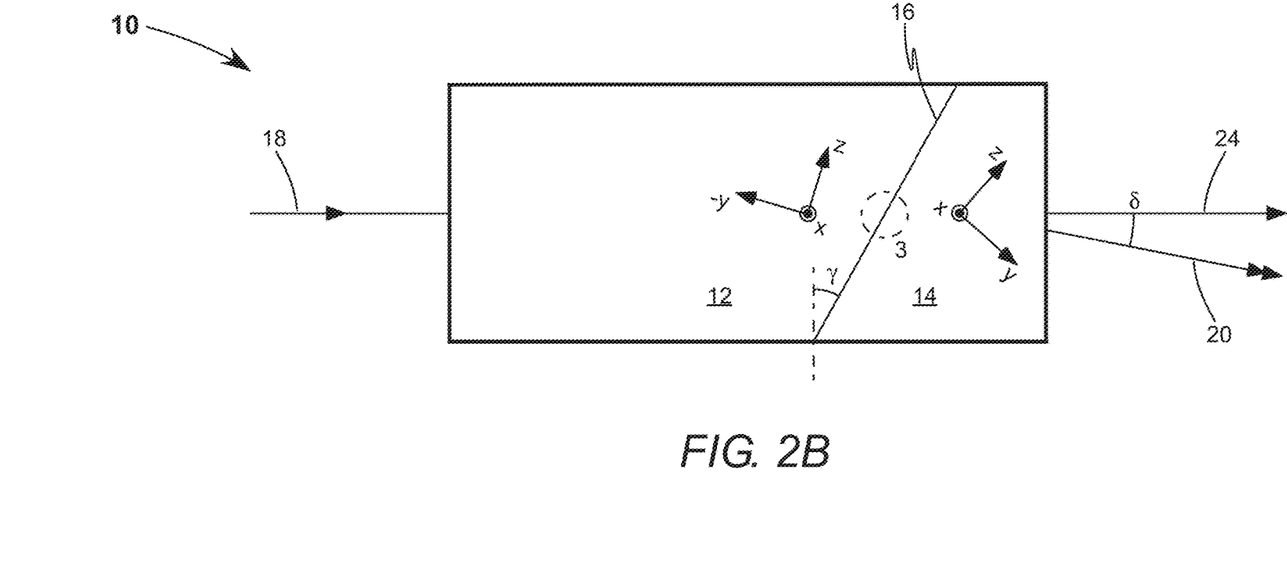

FIGS. 2A and 2B are cross-sectional views schematically illustrating further details of optic 10. FIG. 2A is a plan view and FIG. 2B is a side view. The internal beams are omitted in these drawings for clarity of illustration. FIG. 2A indicates the external Brewster angle $\alpha_F$ of fundamental beam 18 and the external angle $\alpha_{SH}$ of second-harmonic beam 20 emerging from output surface 26. These beams diverge at an angle $\Delta\alpha$ in the plane of FIG. 2A and an angle $\delta$ in the plane of FIG. 2B.

The principle crystal axes x, y, and z are oriented in first crystal 12 and second crystal 14 as depicted in FIGS. 2A and 2B. The principle crystal axes are symmetrically oriented with respect to internal interface 16. Specifically, the principle crystal axes have reflection symmetry about internal interface 16. One particular advantage of this symmetrical arrangement is that the coefficients of thermal expansion of the first and second crystals are matched in all directions at the internal interface.

Matching the coefficients of thermal expansion is important when bonding the crystals together. Crystals can be bonded using commercial polymer adhesives. For example, one of the light-cured optical adhesives available from Norland Products Inc. of Cranbury, N.J. These adhesives are nominally transparent over relatively broad wavelength ranges, can be cured at room temperature, and the adhesive itself provides some compliance when a bond is stressed by heating. However, such an adhesive layer is still weakly absorbing and is degraded by high-power ultraviolet radiation. Sufficient heating by optical radiation or otherwise will cause the bond to fail if the crystals have different coefficients of thermal expansion.

Where a bond is exposed to ultraviolet radiation, especially for high-power applications, optical contact bonding is preferred. Contact bonding forms direct chemical bonds between crystals, eliminating intermediary adhesive layers, and is therefore extremely reliable and durable. Contact bonding is achieved by pressing together extremely-flat polished surfaces at a relatively high temperature. For example, at temperatures exceeding 800° C. when bonding beta barium borate (BBO). Therefore, even small differences in the coefficients of thermal expansion can cause significant stress during cooling, causing the crystals to separate or crack. BBO has a factor of nine difference between coefficients of thermal expansion along orthogonal crystal axes. The inventive optic, having crystals made of the same material that are oriented to match the coefficients of thermal expansion at internal interface 16, can be contact bonded at high temperatures without such failures due to thermal stress.

Another advantage of optic 10 is that there is minimal reflection of fundamental beam 18 at internal interface 16, since there is no change in refractive index when a beam having ordinary polarization propagates therethrough. Minimizing power losses for the fundamental beam is particularly important when optic 10 is incorporated into a laser resonator or resonant-enhancement cavity. Losses for the circulating fundamental beam significantly diminish the efficiency of such a resonator and the impact of such losses is enhanced by the nonlinearity of the second-harmonic generation.

Figure 3:
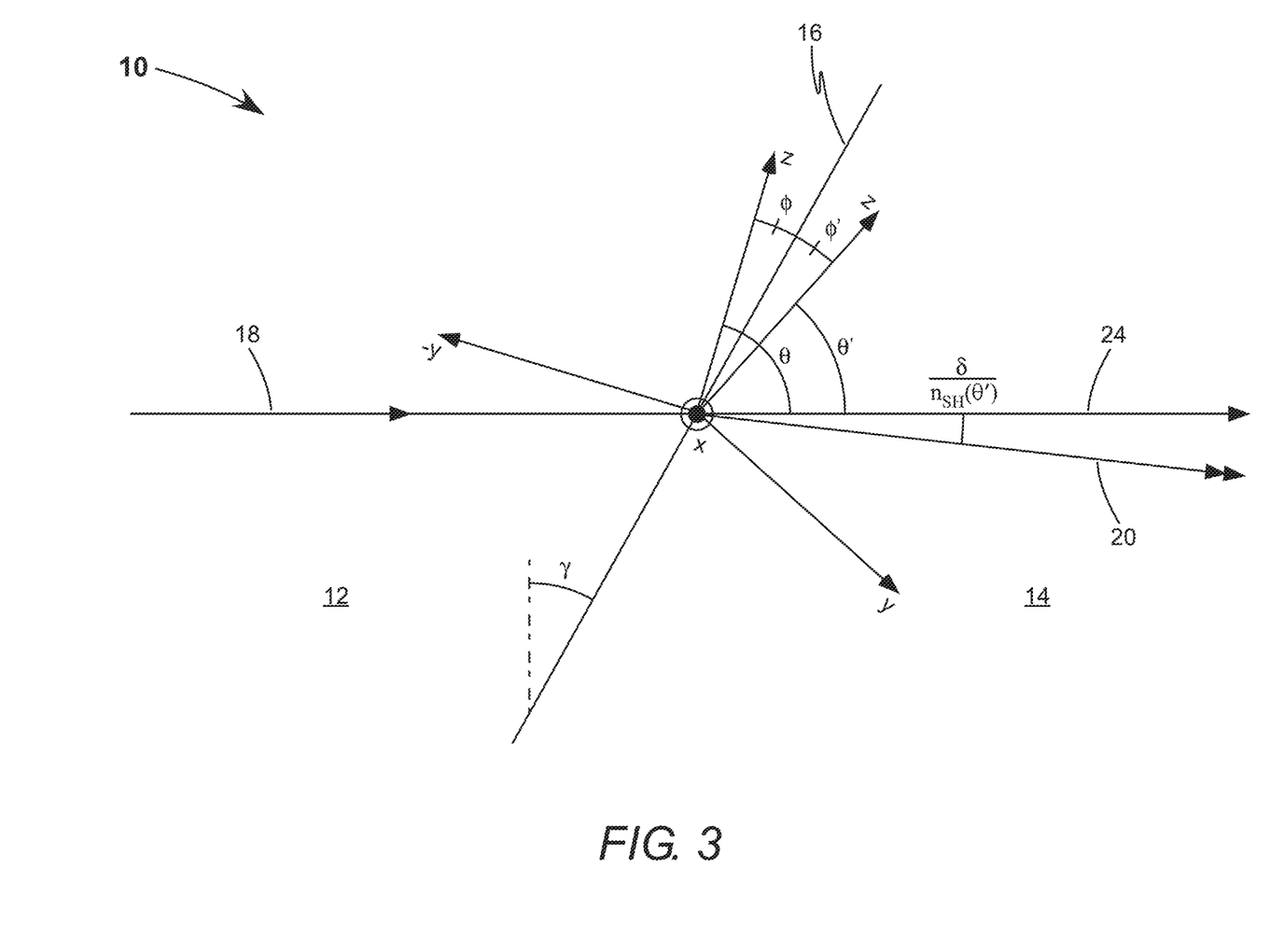
FIG. 3 is a magnified cross-sectional side view illustrating further details of the optic of FIGS. 1A-1C.

FIG. 3 is a magnified view of internal interface 16 as it is depicted in the cross-sectional side view of FIG. 2B. The principle crystal axes of first crystal 12 and second crystal 14 are centered on the internal interface in the drawing to emphasize their symmetry about the internal interface. The z-axis of first crystal 12 is tilted at an angle $\phi$ with respect to the internal interface and the z-axis of second crystal 14 is tilted at an angle $\phi'$ in the opposite direction with respect to the internal interface. These tilt angles $\phi$ and $\phi'$ are the same to match the coefficients of thermal expansion. The z-axis of the first crystal is at an angle $\theta$ with respect to fundamental beam 18 that is selected to achieve phase matching. The z-axis of the second crystal is at a different angle $\theta'$ with respect to fundamental beam 18. Second-harmonic beam 20 is refracted away from residual fundamental beam 24 in the plane of the drawing by an internal angle that is $$\frac{\delta}{n_{SH}(\theta')}$$

in the paraxial approximation. Herein, $n_F$ is the refractive index for the fundamental beam in both crystals, $n_{SH}(\theta)$ is the refractive index for the second-harmonic beam in the first crystal, and $n_{SH}(\theta)$ is the refractive index for the second-harmonic beam in the second crystal.

Figure 4A:
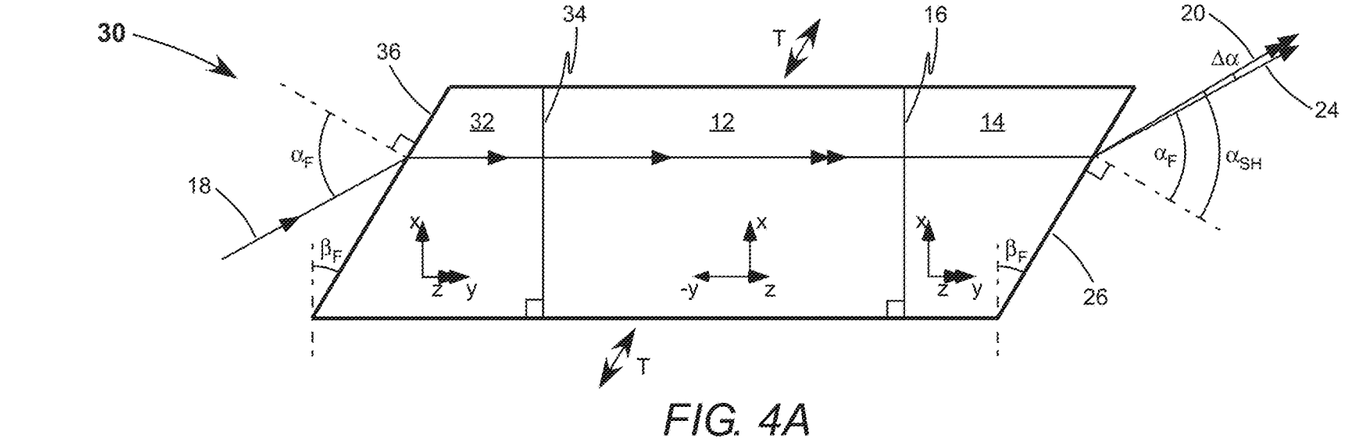
FIG. 4A is a cross-sectional plan view and FIG. 4B is a cross-sectional side view schematically illustrating another preferred embodiment of an optic in accordance with the present invention, similar to the optic of FIGS. 1A-1C, but including a third crystal bonded to the first crystal along another planar interface.
Figure 4B:
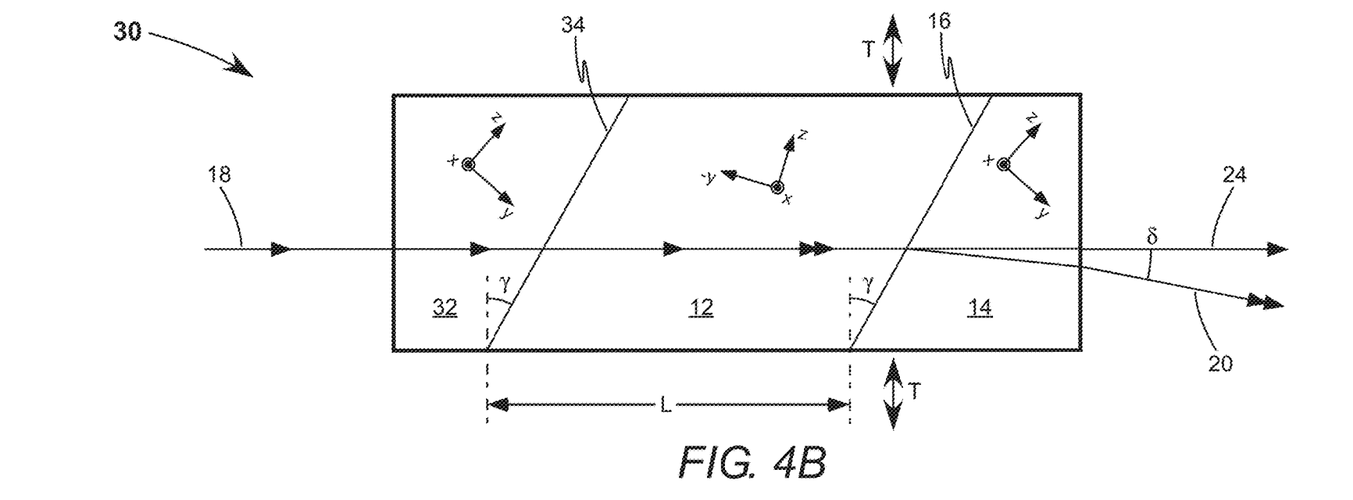

FIGS. 4A and 4B schematically illustrate another preferred embodiment of an optic 30 in accordance with the present invention. FIG. 4A is a cross-sectional plan view and FIG. 4B is a cross-sectional side view of optic 30. Optic 30 is similar to optic 10, but has an additional third crystal 32, which is made of the same optically-nonlinear transparent material as first crystal 12 and second crystal 14. First crystal 12 and third crystal 32 are bonded together along a planar internal interface 34 that is preferably parallel to internal interface 16. The principle crystal axes of the third crystal preferably have the same orientations as the respective principle crystal axes of the second crystal. An uncoated input surface 36 is located on the third crystal of optic 30 and is oriented at the internal Brewster angle $\beta_F$ of fundamental beam 18. Input surface 36 and output surface 26 are preferably parallel.

An advantage of optic 30 over optic 10 is that fundamental beam 18 propagates through a constant path length L in first crystal 12, regardless of the location that the fundamental beam is incident on input surface 36. This constant path length enables translation of optic 30 without changing the overall efficiency of second-harmonic generation. Parallel input surface 36 and output surface 26 enable optic 30 to be translated without displacing any of the external beams. Such translation can be used to extend the useful life of optic 30, since an area or volume that has been degraded or otherwise damaged by the UV radiation can be shifted relative to the beams. Optic 30 can be translated in two dimensions, as indicated by the double-headed arrows T in the drawings, making a two-dimensional array of incident locations available on the input surface. The maximum number of incident locations will depend on the diameter of the fundamental beam relative to the dimensions of the optic.

Figure 5:
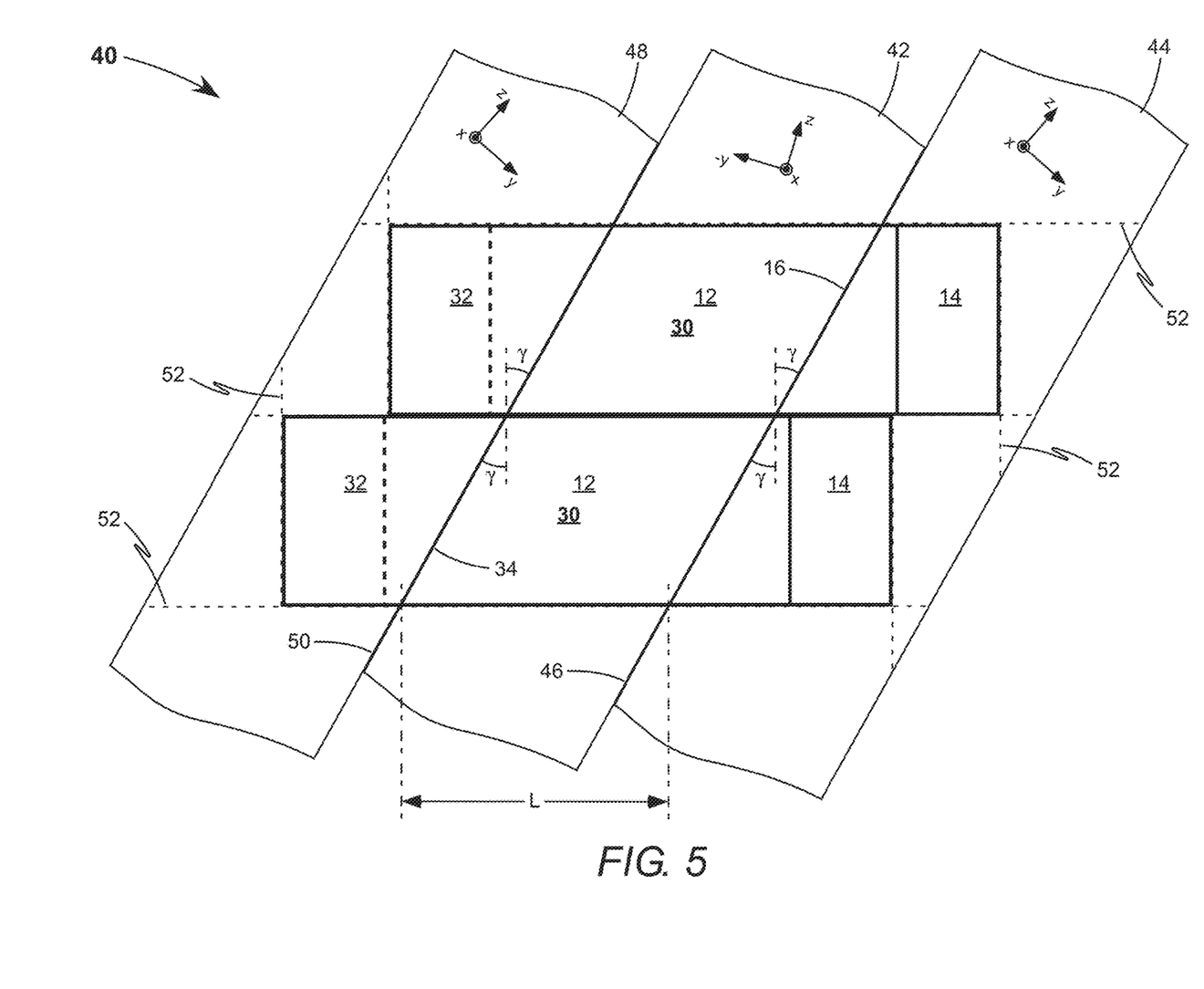
FIG. 5 is a side view schematically illustrating a method in accordance with the present invention to fabricate the optic of FIGS. 4A and 4B.

FIG. 5 is a side view schematically illustrating a method 40 in accordance with the present invention to efficiently and precisely fabricate optic 30. A first preform 42 and a second preform 44 are bonded together along a planar interface 46. First preform 42 and a third preform 48 are bonded together along a parallel planar interface 50. The principle crystal axes of first preform 42 are oriented with respect to the parallel planar interfaces to provide phase-matching for second-harmonic generation. Second preform 44 and third preform 48 have principle crystal axes symmetrically oriented with respect to the principle crystal axes of first preform 42 and oriented to match the coefficients of thermal expansion in all directions along each parallel planar interface. Length L would be selected to optimize the second-harmonic generation efficiency. Angle γ is a nominally free parameter that may be selected according to considerations described below.

A plurality of optics 30 (two are depicted) can be fabricated from the bonded preforms of FIG. 5 by cutting the bonded preforms along cut lines 52. Material within the first, second, and third preforms becomes respectively the first, second, and third crystals of each optic 30. Planar interface 46 becomes internal interface 16 and planar interface 50 becomes internal interface 34. Input and output surfaces of the cut optics are then polished to a desired optical quality. Method 40 minimizes the total volume of waste material removed in the fabrication of optics 30 and minimizes the number of discrete operations necessary to fabricate a batch of optics. A similar method may be used to fabricate a plurality of optics 10 by cutting two oriented and bonded preforms.

A precise way to prepare the preforms is to cut them from one larger block of the optically-nonlinear material. The first preform would be cut at angle γ along intended planar interface 46. The cut surfaces are polished and the offcut becomes the second preform. The second preform is rotated by 180° and planar interface 46 is formed by contact bonding the first preform to the second preform. Similarly, the third preform is cut from the first preform along intended planar interface 50, the cut surfaces are polished, the third preform is rotated by 180°, and then the third preform is contact bonded to the first preform to form planar interface 50.

Figure 6A:
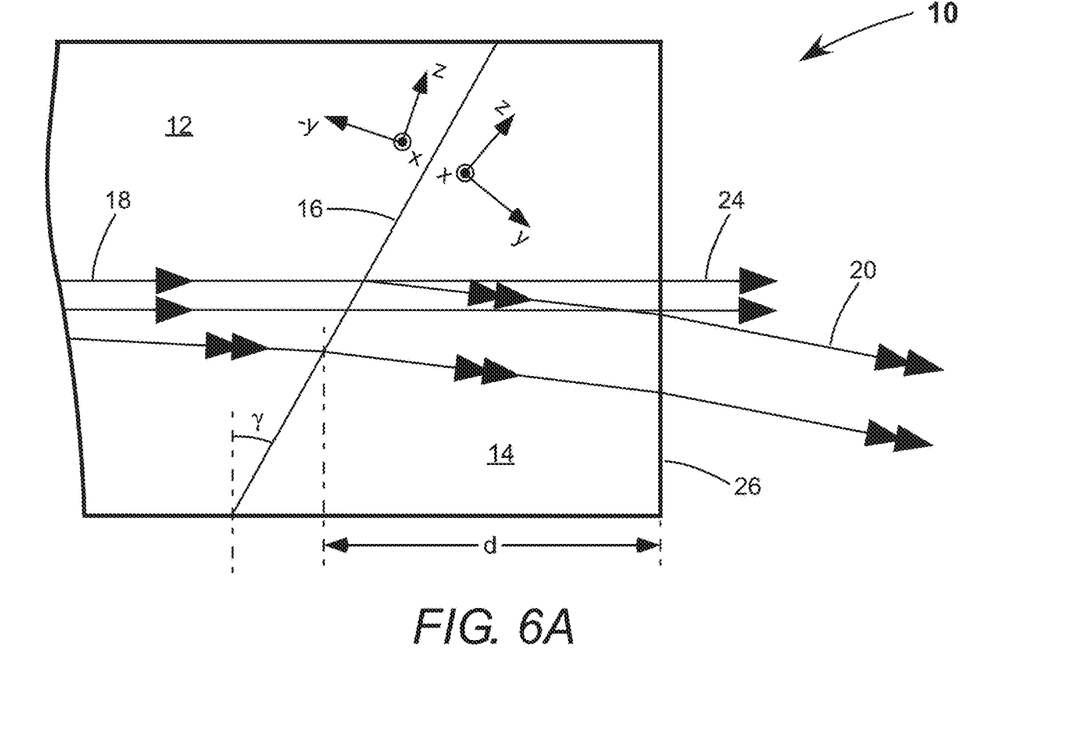
FIG. 6A is an example of the optic of FIGS. 1A-1C having the principle crystal axes and the planar interface tilted at angles selected to maximize separation between the beam of fundamental radiation and the beam of second-harmonic radiation on the output surface.

FIG. 6A is a cross-sectional side view illustrating an example of optic 10 having angle γ selected to maximize the separation between residual fundamental beam 24 and second-harmonic beam 20 on output surface 26. For some optically-nonlinear materials, it is known that the threshold for damage is lower and/or the rate of degradation is higher when a surface is exposed to fundamental radiation and UV radiation simultaneously; that is respectively lower and higher than when the surface is exposed to each radiation individually. Therefore, when using these optically-nonlinear materials and particularly in high-power applications, it is desirable to separate these beams. Another advantage is that the fundamental radiation does not propagate through an area on the output surface that has been degraded by the UV radiation, which extends the useful life of the optic in an intra-cavity application.

FIG. 6A depicts a specific example having optic 10 made of BBO for operation at a temperature of about 200° C. The fundamental wavelength is 426 nm and the second-harmonic wavelength is 213 nm. Residual fundamental beam 24 and second-harmonic beam 20 are depicted by boundary rays thereof. Fundamental beam 18 and residual fundamental beam 24 have a diameter of approximately 330 micrometers (μm) near internal interface 16. Angle γ is selected to be 29.25°. Angle θ is 73.3° and angle θ' is 48.2° to achieve both phase matching in crystal 12 and symmetry of the principle crystal axes. The example takes advantage of spatial walk-off of the second-harmonic beam from the fundamental beam within first crystal 12, which is due to birefringence. Boundary rays on one side of the second-harmonic beam diverge from the fundamental beam at an angle of approximately 2.9°. After refraction at internal interface 16, the second-harmonic beam diverges from the residual fundamental beam at an angle of approximately 6.4°. A distance d between internal interface 16 and output surface 26 of about 3 millimeters (mm) is sufficient to separate the beams on the output surface.

Figure 6B:
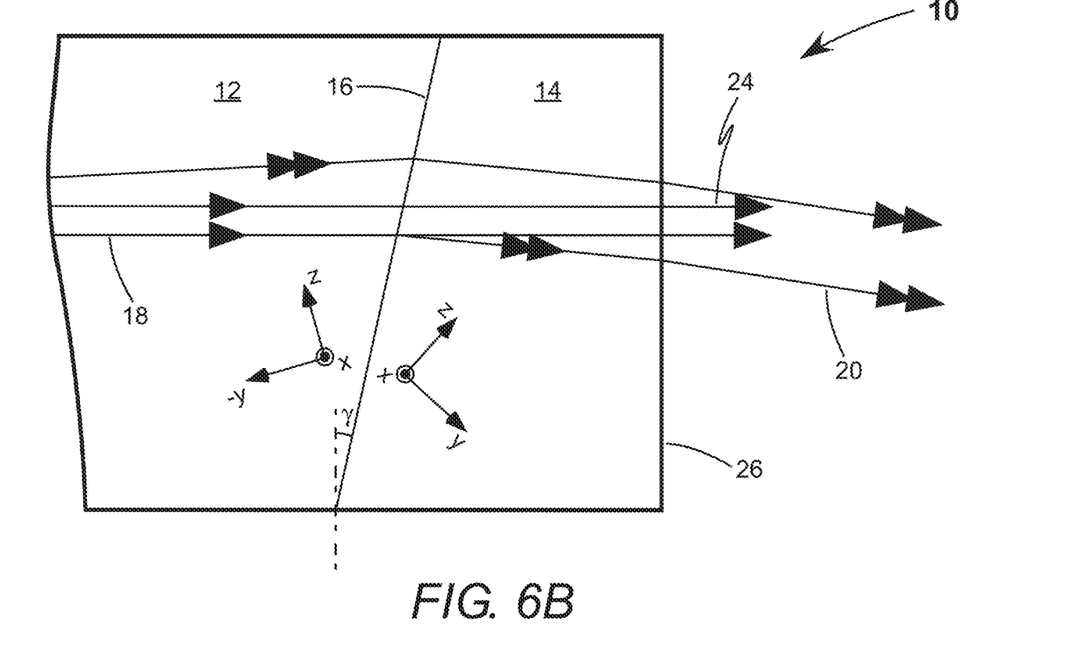
FIG. 6B is an example of the optic of FIGS. 1A-1C having the principle crystal axes and the planar interface tilted at angles selected to maximize overlap of the beam of fundamental radiation and the beam of second-harmonic radiation on the output surface.

FIG. 6B is a cross-sectional side view illustrating another example of optic 10, but here angle γ is selected to maximize the overlap of residual fundamental beam 24 and second-harmonic beam 20 on output surface 26. Again, in the specific example depicted, optic 10 is made of BBO. The fundamental wavelength is 426 nm and the second-harmonic wavelength is 213 nm. Fundamental beam 18 and residual fundamental beam 24 have a diameter of approximately 330 μm near internal interface 16. Angle γ is selected to be 12.5°. Angle θ is 106.7°, which is equivalently an angle of 73.3° with respect to fundamental beam 18 to achieve phase matching, but having the z-axis tilted in the opposite direction with respect to the fundamental beam propagation. Angle θ' is 48.3° to achieve symmetry of the principle crystal axes. Changing the z-axis tilt direction in first crystal 12 causes spatial walk-off of the second-harmonic beam on the opposite side thereof. Boundary rays on this opposite side of second-harmonic beam 20 diverge from fundamental beam 18 at an angle of approximately 2.9°. After refraction at internal interface 16, the second-harmonic beam converges towards the residual fundamental beam at an angle of approximately 6.4°.

Together, FIGS. 6A and 6B demonstrate how nominally-free angle γ can be selected to manipulate the mutual separation of the residual fundamental beam and the second-harmonic beam. However, there will be a compromise between reflection of the residual fundamental beam from the internal interface and separating the beams on the output surface. Otherwise, angle γ can have any value between 0° and a maximum angle that corresponds to the largest acceptable dispersion imparted onto the beams, while maintaining symmetry between the principle crystal axes (tilt angle ϕ=tilt angle ϕ'). Preferably, the principle crystal axes of the bonded crystals are mutually separated by an angle 2ϕ of at least 2°, to minimize second-harmonic conversion in the second crystal. More preferably, the principle crystal axes are mutually separated by an angle of at least 5°, and most preferably by an angle of at least 12°. For BBO, this is a mutual angular separation of the z-axes (the crystallographic c-axes) of the two crystals, while the x-axes (one of the crystallographic a-axes) is common to both crystals.

The inventive optic can be made of other optically-nonlinear materials suitable for second-harmonic generation, include lithium triborate (LBO) and cesium lithium borate (CLBO). Angle θ in first crystal 12 is derived from the requirements for phase matching and energy conservation, respectively, which can be expressed as:

$$k_F + k_F = k_{SH} \quad (1)$$

$$\frac{\lambda_F}{2} = \lambda_{SH} \quad (2)$$

where k are the wavevector magnitudes and λ are the wavelengths of the fundamental beam and the second-harmonic beam. Referring to FIG. 3, refractive indices of the polarized fundamental beam at wavelength $\lambda_F$ and the orthogonally polarized second-harmonic beam at wavelength $\lambda_{SH}$ are respectively:

$$n_F = n_x(\lambda_F) \quad (3)$$

$$n_{SH}(\theta) = \sqrt{\frac{1}{\frac{\cos^2(\theta)}{n_y^2(\lambda_{SH})} + \frac{\sin^2(\theta)}{n_z^2(\lambda_{SH})}}} \quad (4)$$

Equations (1) and (2) together require $n_F = n_{SH}(\theta)$, so the phase matching angle $\theta$ in first crystal 12 can be determined from Equations (3) and (4):

$$\theta = \cos^{-1}\left(\sqrt{\frac{\frac{1}{n_x^2(\lambda_F)} - \frac{1}{n_z^2(\lambda_{SH})}}{\frac{1}{n_y^2(\lambda_{SH})} + \frac{1}{n_z^2(\lambda_{SH})}}}\right). \quad (5)$$

Referring to FIG. 2A, by applying Snell's law at output surface 26, the divergence angle $\Delta\alpha$ and refractive index of the second-harmonic beam can be calculated for a selected angle $\theta'$:

$$\Delta\alpha = \alpha_{SH} - \alpha_F = \sin^{-1}(n_{SH}(\theta')\cdot\sin(\beta_F)) - \alpha_F \quad (6)$$

$$n_{SH}(\theta') = \frac{\sin(\alpha_F + \Delta\alpha)}{\sin(\beta_F)}. \quad (7)$$

Referring to FIG. 2B, by applying Snell's law at internal interface 16, the divergence angle $\delta$ can also be calculated for a selected angle $\theta'$ and the corresponding angle $\gamma$:

$$\gamma = 90° - \frac{(\theta + \theta')}{2} \quad (8)$$

$$\delta = \gamma(n_{SH}(\theta') - n_{SH}(\theta)). \quad (9)$$

Alternatively, angle $\theta'$ and the corresponding angle $\gamma$ can be determined to achieve a desired divergence angle $\Delta\alpha$ between the residual fundamental beam and the second-harmonic beam propagating away from the inventive optic. For brevity, just the result for angle $\gamma$ is provided here, while Equation 11 is simply a rearrangement of Equation 8:

$$\gamma = \left(\frac{1}{1 + \frac{n_x(\lambda_F)\sin\beta_F}{\sin(\alpha_F + \Delta\alpha)}}\right) \quad (10)$$

$$\left(180° - \theta - \cos^{-1}\left(\sqrt{\frac{\left(\frac{\sin(\beta_F)}{\sin(\alpha_F+\Delta\alpha)}\right)^2 - \frac{1}{n_z^2(\lambda_{SH})}}{\frac{1}{n_y^2(\lambda_{SH})} - \frac{1}{n_z^2(\lambda_{SH})}}}\right)\right)$$

$$\theta' = 180° - \theta - 2\gamma. \quad (11)$$

Returning to the example above, where the fundamental wavelength is 426 nm and the second-harmonic wavelength is 213 nm. In BBO, at a temperature of 200° C., the refractive indices are calculated to be: $n_x(426) = n_y(426) = 1.686$, $n_z(426) = 1.561$, $n_x(213) = n_y(213) = 1.850$, and $n_z(213) = 1.671$. The internal Brewster angle is $\beta_F = 30.67°$ and the external Brewster angle is $\alpha_F = 59.32°$ at 426 nm. Angle $\theta$ is 73.3° to achieve phase matching in the first crystal. For the specific example above, having angle $\gamma$ selected to be 29.25° and angle $\theta'$ of 48.2° to achieve symmetry of the principle crystal axes, the tilt angles are $\phi = \phi' = 12.55°$ and the divergence angle is $\Delta\alpha = 2.3°$. The refractive index of the second-harmonic beam in the first crystal is $n_{SH}(\theta) = 1.684$ and in the second crystal is $n_{SH}(\theta) = 1.725$.

Figure 7A:
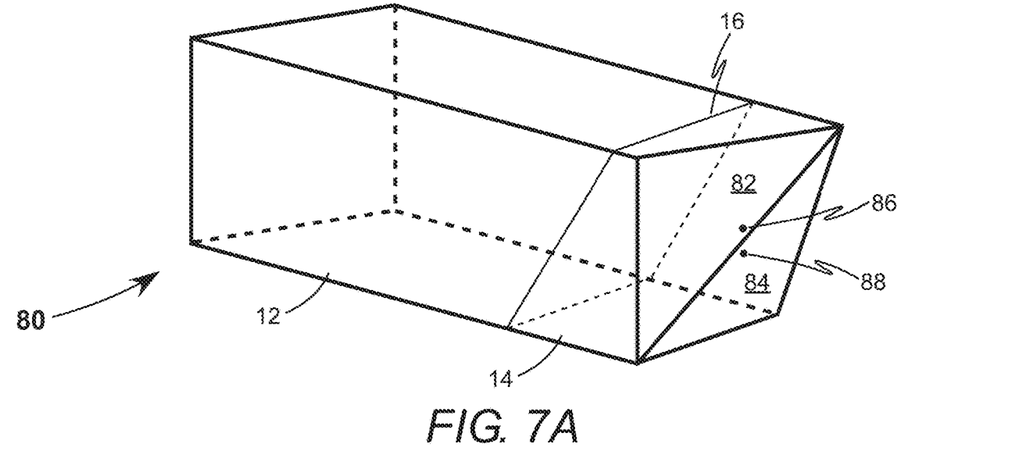
Figure 7B:
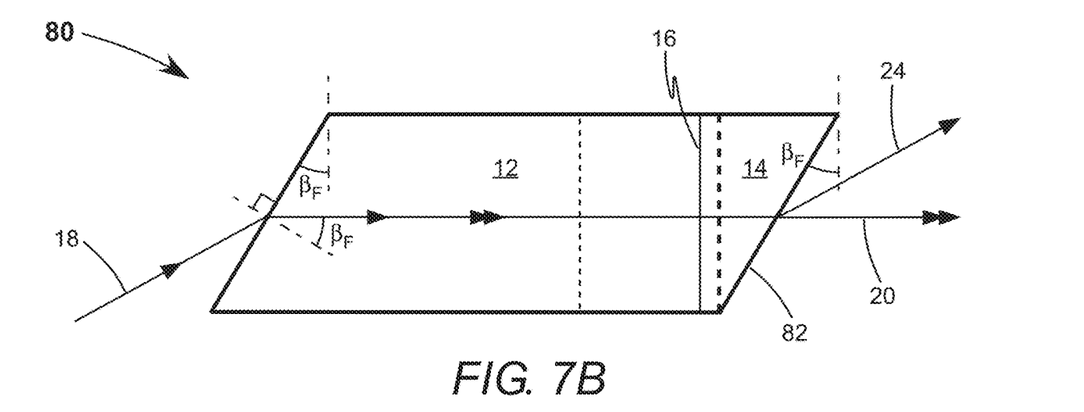
Figure 7C:
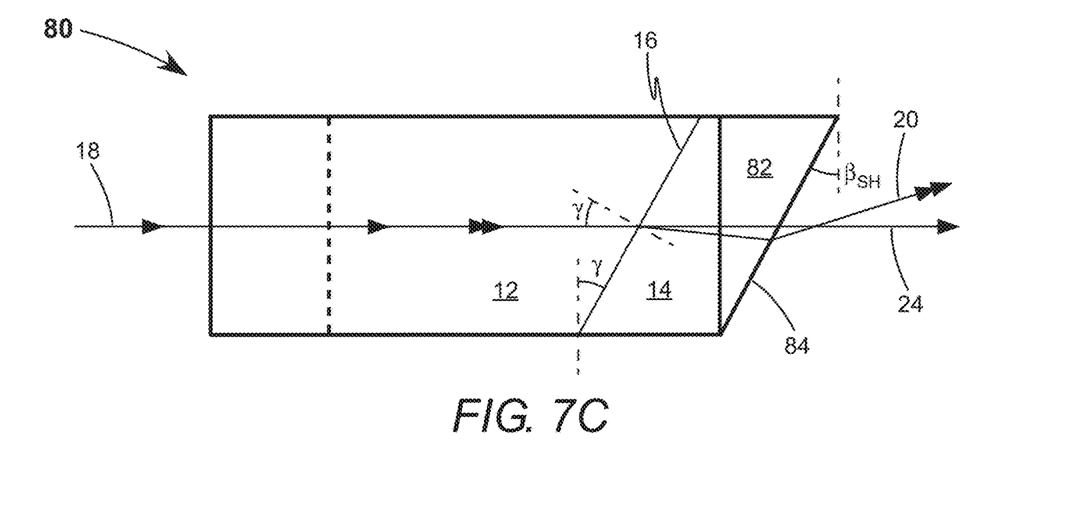
FIG. 7C is a side view schematically illustrating yet another preferred embodiment of an optic in accordance with the present invention, similar to the optic of FIGS. 1A-1C, but the beam of fundamental radiation exiting the optic through one uncoated output surface and the beam of second-harmonic radiation exiting through another uncoated output surface.

FIGS. 7A-7C schematically illustrate yet another preferred embodiment of an optic 80 in accordance with the present invention. FIG. 7A is a perspective view, FIG. 7B is a plan view, and FIG. 7C is a side view of optic 80. Optic 80 is similar to optic 10 of FIGS. 1A-1C, but has a first output surface 82 and a second output surface 84. First output surface 82 is oriented at the internal Brewster angle $\beta_F$ of the fundamental radiation, to minimize reflection losses for residual fundamental beam 24 emerging from second crystal 14. Second output surface 84 is oriented at the internal Brewster angle $\beta_{SH}$ of the second-harmonic radiation, to minimize reflection losses for second-harmonic beam 20 emerging from second crystal 14. An exemplary incident location 86 of the residual fundamental beam on first surface 82 and a corresponding exemplary incident location 88 of the second-harmonic beam on second surface 84 are indicated in FIG. 7A.

Second output surface 84 essentially eliminates internally reflected beam 28 depicted in FIG. 1B and all of the second-harmonic radiation generated in first crystal 12 emerges from second surface 84. Another advantage of optic 80 is that the second-harmonic beam is highly divergent from the residual fundamental beam after emerging from second surface 84. Optic 30 could similarly be fabricated with a second output surface. The incident locations available on the input surface would then lie along a diagonal line when translating the optic.

Figure 8:
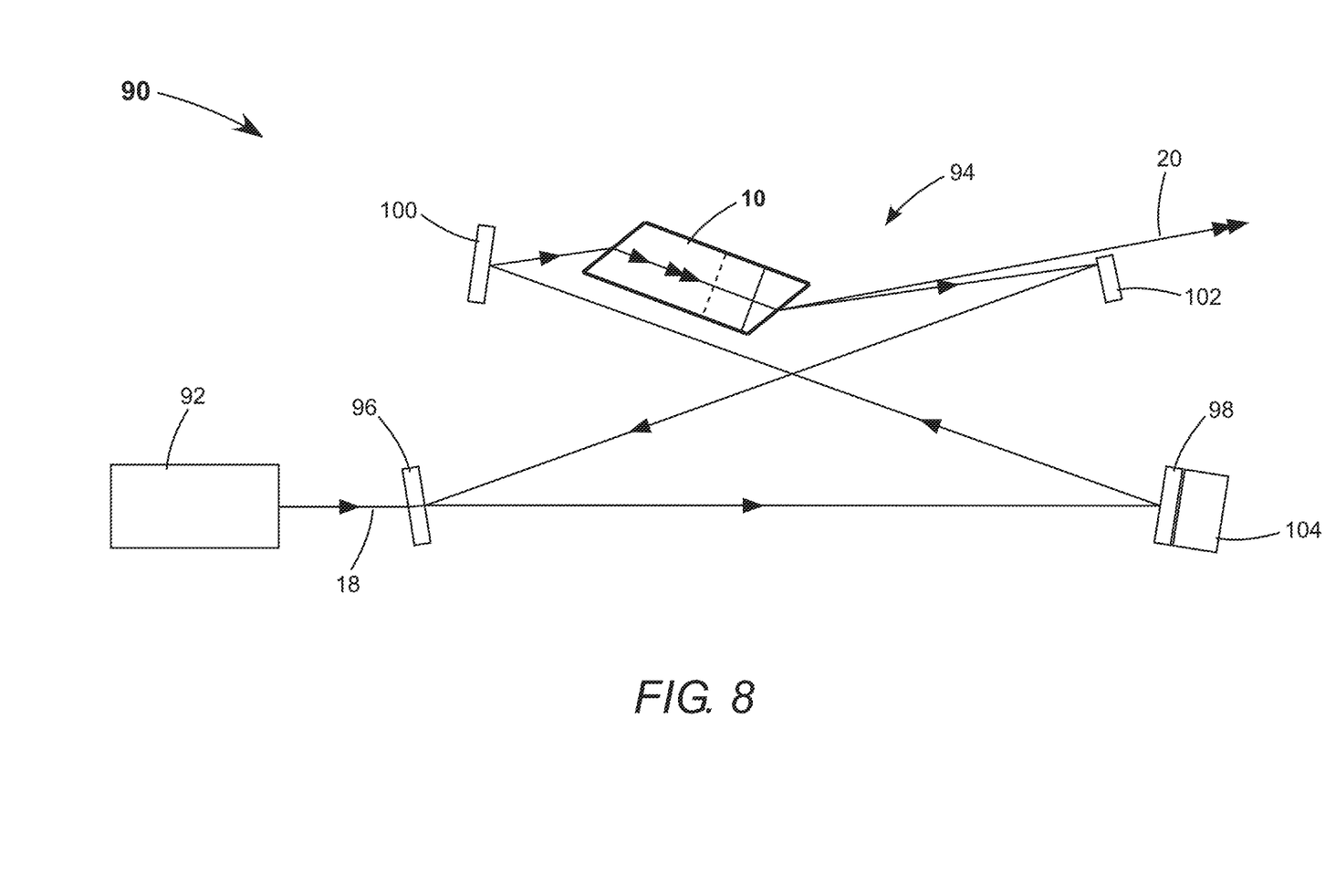
FIG. 8 schematically illustrates one embodiment of a laser system in accordance with the present invention, including a laser, a resonant-enhancement cavity, and the optic of FIGS. 1A-1C.

FIG. 8 schematically illustrates a preferred embodiment of a laser system 90 in accordance with the present invention for producing a beam of second-harmonic laser radiation 20. Laser system 90 includes a laser 92 delivering a beam of fundamental laser radiation 18 to an impedance-matched resonant-enhancement cavity 94 defined, here, by four cavity mirrors 96, 98, 100, and 102. The four cavity mirrors are highly reflective at the fundamental wavelength and are arranged to direct the fundamental laser beam along a closed path within resonant-enhancement cavity 94. Fundamental laser beam 18 couples into the resonant-enhancement cavity through cavity mirror 96. Cavity mirror 98 is mounted on a piezoelectric (PZT) transducer 104 for adjustment of the optical length of the closed beam path. PZT transducer 104 requires an electrical driver that is not depicted. Impedance matching is achieved by continuous adjustment of the optical length of the resonant-enhancement cavity.

Laser system 90 also includes optic 10, which is located in the closed beam path of resonant-enhancement cavity 94 to partially convert fundamental laser beam 18 to second-harmonic laser beam 20. Cavity mirror 102 is located and arranged to reflect the fundamental laser beam and allow the diverging second-harmonic laser beam to propagate out of the resonant-enhancement cavity. The inventive optic that spatially separates the laser beams eliminates need for an additional intra-cavity dichroic mirror to direct the second-harmonic laser beam out of the resonant-enhancement cavity. Any of optic 10, optic 30, or optic 80 could be incorporated into laser system 90.

The inventive optics described herein above are particularly useful for type-I second-harmonic generation. However, one of skill in the art would recognize that equivalent optics could be fabricated for other optically nonlinear processes, such as type-II second-harmonic generation and sum-frequency generation. In type-II second-harmonic generation, two photons having the fundamental wavelength and orthogonal linear polarizations are converted into each photon having the second-harmonic wavelength and ordinary linear polarization. In sum-frequency generation, two photons having different fundamental wavelengths are converted into each photon having a sum-frequency wavelength. That is, radiation having a first fundamental wavelength $\lambda_{F1}$ and radiation having a second fundamental wavelength $\lambda_{F2}$ is converted to radiation having a sum-frequency wavelength $\lambda_{SF}$. Here, "fundamental wavelength" refers to a wavelength longer than the sum-frequency wavelength. These wavelengths have the approximate relation:

$$\frac{1}{\lambda_{F1}} + \frac{1}{\lambda_{F1}} = \frac{1}{\lambda_{SF}}. \quad (12)$$

Sum-frequency generation may also be a type-I process with a common fundamental polarization or a type-II process with different fundamental polarizations. It should be noted that second-harmonic generation is a special case of sum-frequency generation, having just one fundamental wavelength and usually just one fundamental beam.

In summary, an optic is disclosed that partially converts a fundamental beam to a second-harmonic beam and spatially separates the second-harmonic beam from the residual fundamental beam. The inventive optic comprises two or three crystals made of the same optically-nonlinear material that are bonded along planar interfaces. The principle axes of the crystals have reflection symmetry about each planar interface to enable contact bonding of the crystals for high-power applications. The output surfaces of the inventive optic are at Brewster angle with respect to the fundamental beam to minimize reflection losses and the output surfaces are uncoated to minimize optical damage. The angular separation between the second-harmonic beam and the residual fundamental beam is determined by selecting the tilt angles of the principle crystal axes and the planar interfaces with respect to the fundamental beam. Importantly, these beams can be spatially separated on the output surfaces to further minimize optical damage and to extend the useful lifetime of the optic.

The present invention is described above in terms of a preferred embodiment and other embodiments. The invention is not limited, however, to the embodiments described and depicted herein. Rather, the invention is limited only by the claims appended hereto.

What is claimed is:

1. An optic for converting radiation having a fundamental wavelength to radiation having a second-harmonic wavelength, comprising:
    a first crystal made of an optically-nonlinear material having principle crystal axes, the principle crystal axes of the first crystal oriented to convert fundamental radiation to second-harmonic radiation by second-harmonic generation; and
    a second crystal made of the same optically-nonlinear material as the first crystal, the first and second crystals bonded together along a first planar interface, the first planar interface tilted with respect to the fundamental radiation;
    wherein the principle crystal axes of the first and second crystals have a mutual angular separation and have reflection symmetry about the first planar interface, the coefficients of thermal expansion of the first and second crystals thereby matched along the first planar interface.

2. The optic of claim 1, wherein the principle crystal axes of the first and second crystals are oriented such that the fundamental radiation is not refracted and the second-harmonic radiation is refracted at the first planar interface.

3. The optic of claim 1, wherein the fundamental radiation enters the optic through an uncoated input surface at Brewster angle with respect to the fundamental radiation.

4. The optic of claim 1, wherein the fundamental radiation exits the optic through an uncoated output surface at Brewster angle with respect to the fundamental radiation.

5. The optic of claim 4, wherein a tilt angle of the first planar interface with respect to the fundamental radiation and a distance between the first planar interface and the output surface are selected to separate the fundamental radiation from the second-harmonic radiation on the output surface.

6. The optic of claim 4, wherein a tilt angle of the first planar interface with respect to the fundamental radiation and a distance between the first planar interface and the output surface are selected to overlap the fundamental radiation and the second-harmonic radiation on the output surface.

7. The optic of claim 4, wherein the second-harmonic radiation exits the optic through another uncoated output surface at Brewster angle with respect to the second-harmonic radiation.

8. The optic of claim 1, wherein the fundamental radiation enters and exits the optic through parallel uncoated surfaces at Brewster angle with respect to the fundamental radiation.

9. The optic of claim 1, wherein the first and second crystals are bonded together by optical contact bonding.

10. The optic of claim 1, further including a third crystal made of the same optically-nonlinear material as the first and second crystals, the third crystal bonded to the first crystal along a second planar interface, the second planar interface parallel to the first planar interface, the principle crystal axes of the first and third crystals having a mutual angular separation and having reflection symmetry about the second planar interface, the coefficients of thermal expansion of the first and third crystals thereby matched along the second planar interface.

11. The optic of claim 10, wherein respective principle crystal axes of the second and third crystal have the same orientations.

12. The optic of claim 10, wherein the first and third crystals are bonded together by optical contact bonding.

13. The optic of claim 1, wherein the principle crystal axes of the first and second crystals are mutually separated by at least 5°.

14. The optic of claim 13, wherein the principle crystal axes of the first and second crystals are mutually separated by at least 12°.

15. The optic of claim 1, wherein the second-harmonic generation is type-I second-harmonic generation.

16. The optic of claim 1, wherein the optically-nonlinear material is selected from the group consisting of beta barium borate (BBO), lithium triborate (LBO), and cesium lithium borate (CLBO).

17. The optic of claim 1, wherein the fundamental radiation has a wavelength of about 426 nanometers and the second-harmonic radiation has a wavelength of about 213 nanometers.

18. A laser apparatus for producing a beam of laser radiation at a second-harmonic wavelength, comprising:
    a laser delivering a beam of laser radiation at a fundamental wavelength that is twice the second-harmonic wavelength;
    an impedance-matched resonant-enhancement cavity receiving the fundamental laser beam, the resonant-enhancement cavity defined by a plurality of cavity mirrors that are highly reflective at the fundamental wavelength and are arranged to direct the fundamental laser beam along a closed path within the resonant-enhancement cavity; and an optic located in the closed beam path of the resonant-enhancement cavity, the optic including a first crystal and a second crystal made of the same optically-nonlinear material, the optically-nonlinear material having principle crystal axes, the principle crystal axes of the first crystal oriented to convert laser radiation at the fundamental wavelength to laser radiation at the second-harmonic wavelength by second-harmonic generation, the first and second crystals bonded together along a planar interface that is tilted with respect to the fundamental laser beam;

wherein the principle crystal axes of the first and second crystals are mutually separated by an angle of at least 2°, the principle crystal axes of the first and second crystals having reflection symmetry about the planar interface, the coefficients of thermal expansion of the first and second crystals thereby matched along the planar interface.

19. The optic of claim 18, wherein the fundamental laser beam enters the optic through an uncoated input surface and exits the optic through a parallel uncoated output surface, the input and output surfaces at Brewster angle with respect to the fundamental laser beam.

20. The optic of claim 19, wherein a tilt angle of the planar interface with respect to the fundamental laser beam and a distance between the planar interface and the output surface are selected to separate the fundamental laser beam from the second-harmonic laser beam on the output surface.

21. The optic of claim 18, wherein the first and second crystals are bonded together by optical contact bonding.

22. The optic of claim 18, wherein the second-harmonic generation is type-I second-harmonic generation.

23. An optic for converting radiation having a first fundamental wavelength and radiation having a second fundamental wavelength to radiation having a sum-frequency wavelength, comprising:

a first crystal made of an optically-nonlinear material having principle crystal axes, the principle crystal axes of the first crystal oriented to convert first fundamental radiation and second fundamental radiation to sum-frequency radiation by sum-frequency generation; and a second crystal made of the same optically-nonlinear material as the first crystal, the first and second crystals bonded together along a planar interface, the planar interface tilted with respect to the first and second fundamental radiation;

wherein the principle crystal axes of the first and second crystals have a mutual angular separation and have reflection symmetry about the planar interface, the coefficients of thermal expansion of the first and second crystals thereby matched along the planar interface.

24. The optic of claim 23, wherein the first and second fundamental radiation exits the optic through an uncoated output surface at Brewster angle with respect to the first and second fundamental radiation.

25. The optic of claim 24, wherein a tilt angle of the planar interface with respect to the first and second fundamental radiation and a distance between the planar interface and the output surface are selected to separate the first and second fundamental radiation from the sum-frequency radiation on the output surface.

26. The optic of claim 23, wherein the first and second crystals are bonded together by optical contact bonding.

* * * * *